(12) United States Patent
Ogris

(10) Patent No.: US 8,609,190 B2
(45) Date of Patent: Dec. 17, 2013

(54) METHOD FOR PRODUCING A GETTER DEVICE

(75) Inventor: Erhard Ogris, Althofen (AT)

(73) Assignee: Alvatec Alkali Vacuum Technologies GmbH, Althofen (AT)

( * ) Notice: Subject to any disclaimer, the term of this patent is extended or adjusted under 35 U.S.C. 154(b) by 173 days.

(21) Appl. No.: 13/059,573

(22) PCT Filed: Aug. 13, 2009

(86) PCT No.: PCT/AT2009/000311
§ 371 (c)(1),
(2), (4) Date: Feb. 17, 2011

(87) PCT Pub. No.: WO2010/019977
PCT Pub. Date: Feb. 25, 2010

(65) Prior Publication Data
US 2011/0151143 A1    Jun. 23, 2011

(30) Foreign Application Priority Data

Aug. 18, 2008  (AT) ................................ A 1283/2008

(51) Int. Cl.
*B05D 7/22*     (2006.01)
*H05B 6/02*     (2006.01)

(52) U.S. Cl.
USPC ............ 427/230; 427/238; 427/239; 427/591

(58) Field of Classification Search
None
See application file for complete search history.

(56) References Cited

U.S. PATENT DOCUMENTS

| | | | | |
|---|---|---|---|---|
| 4,490,411 A | * | 12/1984 | Feder | 427/543 |
| 7,223,447 B2 | * | 5/2007 | Brown et al. | 427/543 |
| 2009/0123775 A1 | * | 5/2009 | Kanzaki et al. | 428/586 |

FOREIGN PATENT DOCUMENTS

| | | | | |
|---|---|---|---|---|
| AT | 501 616 | | 10/2006 | |
| DE | 35 30 058 | | 9/1986 | |
| GB | 835 885 | | 5/1960 | |
| JP | 2003-239860 | | 8/2003 | |
| SU | 559037 | | 5/1977 | |
| WO | 2006/010179 | | 2/2006 | |
| WO | WO2006010179 | * | 2/2006 | ............ F04B 37/02 |
| WO | WO2007/119706 | * | 10/2007 | ............ C23C 8/16 |

* cited by examiner

*Primary Examiner* — Timothy Meeks
*Assistant Examiner* — Ina Agaj
(74) *Attorney, Agent, or Firm* — Greenblum & Bernstein, P.L.C.

(57) ABSTRACT

The invention relates to a method for producing a getter device (1), wherein a getter material (3) is introduced into a container (2) and the getter material (3) is heated to a temperature under reduced pressure so that getter material (3) is deposited on an inside of the container (2). In order to be able to provide a getter device (1) in a short time that has a high getter capacity, it is provided according to the invention that during a deposition of getter material (3), the container (2) is moved relative to a zone (4) in which the container (2) is cooled.

19 Claims, 1 Drawing Sheet

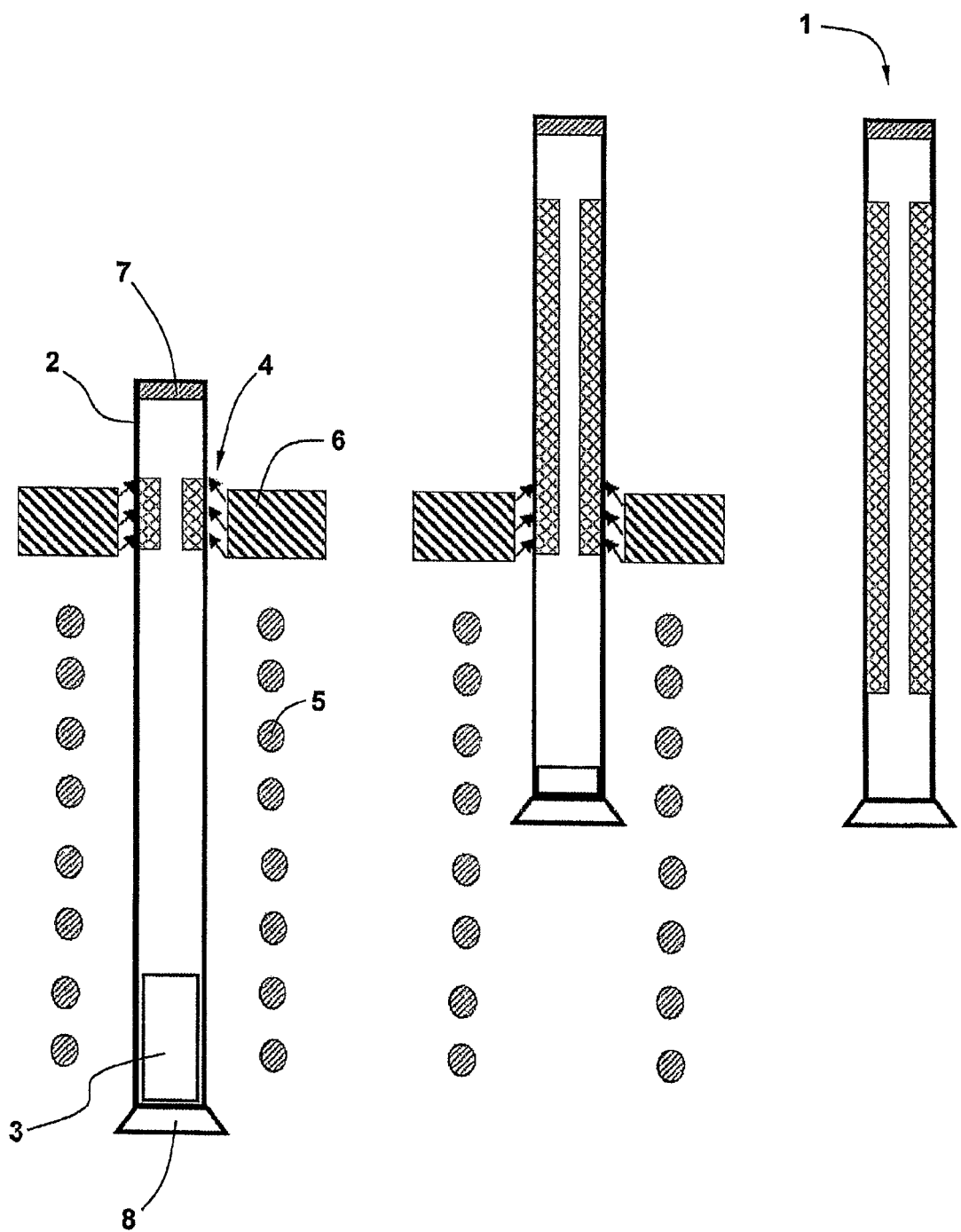

METHOD FOR PRODUCING A GETTER DEVICE

CROSS-REFERENCE TO RELATED APPLICATIONS

The present application is a U.S. National Stage of International Patent Application No. PCT/AT2009/000311 filed Aug. 13, 2009, and claims priority under 35 U.S.C. §§119 and 365 of Austrian Patent Application No. A 1283/2008 filed Aug. 18, 2008.

BACKGROUND OF THE INVENTION

1. Field of the Invention

The invention relates to a method for producing a getter device, wherein a getter material is introduced into a container and the getter material is heated to a temperature under reduced pressure so that getter material is deposited on an inside of the container.

2. Discussion of Background Information

Getter devices are used, for example, in evacuated devices in which in operation or in use a vacuum is to be maintained over long periods as well as possible and therefore any gases entering have to be permanently bound by a getter material.

A getter material that has a high specific getter capacity for a specific gas, e.g., hydrogen, can be supplied in a tubular container of steel, wherein the container is closed at least at one end with a metal melting at low temperatures or a like alloy and the getter material is deposited in layers on an inside of the container.

In the production of a getter device of the above-mentioned type, the procedure has hitherto been that a getter material as a whole piece or powder is introduced into a vial, e.g., as mentioned of steel, closed on one side with a low-melting metal or a like alloy, after which the vial is likewise closed at the other end, e.g., by welding, under reduced pressure, that is, a pressure of less than 1 bar, preferably (high) vacuum. Subsequently, the enclosed getter material is heated so that the getter material in part evaporates and is deposited at a cool point of an inside of the vial in the form of layers. The getter material is thereby intended to be distributed over a large area, which is available later for binding undesirable gases. After an installation in a device and evacuation of the device, the getter device is heated at least in the region of the metal or the corresponding alloy forming a closure and opened thereby so that gases to be bound penetrate into the interior of the getter device and can be bound to the getter material deposited in layers.

In the approach according to the prior art, it has proven to be a disadvantage that only such a limited amount of getter material can be introduced into the vial, that the inside of a container is just covered during the deposition of getter material. If too much getter material is introduced, a plug easily forms or the vial is closed up during the subsequent deposition of the same at a cool point of the vial, so that ultimately a high getter capacity desired for uses is not achieved.

SUMMARY OF THE EMBODIMENTS

This is where the invention starts. The invention is directed to a method of the type mentioned at the outset, which makes it possible to produce a getter device with a high getter capacity with short process times.

Accordingly, a method of the type mentioned at the outset includes that during a deposition of getter material the container is moved relative to a zone in which the container is cooled.

The advantages achieved with the invention are to be seen in particular in that a resublimation zone for evaporated getter material is displaced in a controlled manner by the provided process so that ultimately large parts of an inside of the container can be covered with a large amount of getter material without the container closing up. It is thereby possible to provide a getter device in a short time that has an extraordinarily high getter capacity. Compared to a method hitherto used, at least 100% more getter material can be deposited in layers in the container with the same dimensions of a container. A getter capacity of a getter device produced according to the invention is correspondingly higher in use.

Within the scope of the invention, it is possible for a container closed only on one side to be used and the getter material to be deposited with the simultaneous evacuation of the container. However, it is preferred that the container is closed in a vacuum-tight manner before the getter material is heated. In the latter case, the conditions for a deposit of the getter material on an inside of the container can be controlled particularly exactly because constant conditions are maintained in the interior of the container. The container is thereby preferably closed at least at one point with a seal of metal or an alloy melting at a temperature of 30° to 550° C. If a metal that melts at such low temperatures or a like alloy is provided as a seal, optionally together with a net for holding the metal or the alloy, the prepared getter device can be easily activated in use in that the getter device or at least the closure thereof composed of metal or an alloy is heated to a temperature at which the metal or the alloy melts or at least becomes so soft that the seal opens. The metal or the alloy is selected in this respect such that a melting point is below a temperature at which deposited getter material melts or evaporates. After activation, gas to be absorbed can easily penetrate into the getter device and be bound there. In principle, however, the container can also be closed in a different manner, for example, by a screw closure.

In order, on the one hand, to be able to cool the container well and, on the other hand, to easily convert the getter material into the gas phase in a targeted manner during heating, it can also be provided that the container is composed of a metal or an alloy and the getter material is heated by an induction heating device.

Preferably, it is also provided that a cooling device, with which the container is cooled in the zone, is arranged at a distance from the induction heating device. Although in principle there is an adequate temperature gradient between the position of the induction heating device and regions of the container at a distance therefrom so that getter material is deposited from the gas phase formed, an active cooling with a cooling device is preferred so that getter material is deposited in a controlled manner in certain regions of the inside of the container. In this respect it has proven to be particularly advantageous for a nozzle surrounding the container to be used as a cooling device, through which nozzle the container is cooled in the zone, wherein an air flow is guided by the nozzle at an angle directed at the container so that air flowing away does not flow to the induction heating device. The directed feed of cooling air at a corresponding angle of, e.g., 30° to 60° ensures that the fed air flows away on the container used and cools it thereby, but at the same time moves away from the induction heating device, so that heating and cooling effects do not weaken one another or even offset one another.

Although a method according to the invention can be used for containers of any kind, it is preferred for a tube composed of a steel to be used as a container, namely for the above-mentioned reason of a good heat transfer during cooling and also with respect to the fact that a produced getter device may have to be stored for several months before it is used, which is why a good service life of the getter device under ambient conditions can be required.

For a simple process procedure, it has proven to be expedient to use a straight tube. However, it can also be provided for a curved tube to be used.

Material of at least one alkali metal and/or alkaline earth metal or at least one alloy of alkali metal and/or alkaline earth metals is used as getter material. Under some circumstances it may be advantageous to provide material from several alkali metals and/or alkaline earth metals simultaneously, which have a sufficient vapor pressure for a deposit during heating at different temperatures. In this case, it is possible by means of sequential deposit to deposit a multi-layer getter material which is suitable for binding different gases, wherein a layer deposited later can also cover only a part of a layer deposited first. It is also possible to deposit in the container adjacent layers or layers one behind the other of different getter materials.

It is preferably provided within the scope of the invention that barium is used as a getter material, since in many fields of application chiefly hydrogen, but also other gases, have to be bonded well, for which purpose barium is particularly suitable, and the method according to the invention has proven to be particularly suitable for producing getter devices with barium.

Further features, advantages and effects of the invention are shown by the exemplary embodiment shown below, based on which the invention is explained in even more detail.

BRIEF DESCRIPTION OF THE DRAWINGS

FIG. 1 shows a diagrammatic representation of a sequence of a method according to the invention.

DETAILED DESCRIPTION OF THE EMBODIMENTS

FIG. 1 shows diagrammatically a production of a getter device 1. In the production of the getter device 1, in a first step a container 2 is provided, which preferably is composed of a round, thin-walled steel tube. The steel tube, lightly processed per se, is tightly closed at a lower end by a seal 7. For this purpose, a seal 7 of a metal melting at a temperature of 30° C. to 550° C. or a like alloy is preferably used, e.g., indium, gallium, lead or the like. The getter device 1 can thereby be activated after installation in an evacuated device by a brief heating or melting of the seal 7 so that the container 2 is open at this point and any gas entering a device can be absorbed or bound by a material located in the container 2. Thereafter, a solid getter material 3 is added to the container 2. An alkali metal or earth alkaline metal, e.g., barium is possible as getter material 3 for many purposes. However, it is also possible for alloys of such metals to be used. Furthermore, getter materials can also be used from which a desired active getter material splits off during heating, e.g., alloys of barium with aluminum and nickel. Subsequently, the container 2 is welded at the other end 8 by resistance welding, although other types of closing are also possible. The container 2 is then closed in a vacuum-tight manner.

After the container 2 has been closed on both sides, it is rotated by 180° C. and, as shown on the left in FIG. 1, introduced into an apparatus that comprises an induction heating device 5 as well as a cooling device 6. The container 2 is thereby arranged in a starting position such that the cooling device 6 lies just beneath the seal 7. The cooling device 6 preferably comprises a ring nozzle through which air is blown onto a surface of the container 2 in a direction indicated by arrows in FIG. 1 so that the air cools the container 2 there and flows to the seal 7. After the activation of the cooling device 6, the induction heating device 5 is started up and the getter material 3 is heated so that getter material 3 is converted into the gaseous phase. It is not absolutely necessary thereby for the solid getter material 3 to be heated until melting. Under some circumstances it may already be sufficient for the solid getter material 3 to be heated to a temperature at which a vapor pressure is sufficiently high above the solid phase to render possible a deposit of the getter material 3 on an inside of the container 2. The getter material 3 that has been converted into the gas phase is deposited mainly in the region of a zone 4 cooled by the cooling device 6 on an inside of the container 2.

After the start of the layered deposit of getter material 3 on the inside of the container 2, the container 2 is moved relative to the induction heating device 5 or cooling device 6 fixed in position in the example, wherein the getter material 3 is constantly kept at the temperature by the induction heating device 5, but the cooled zone 4 is shifted along a longitudinal axis of the container 2 so that ultimately the inside of the container 2 is continuously provided with through layers of getter material 3, as shown diagrammatically in the center of FIG. 1. A speed of the movement of the container 2 is thereby selected such that the deposited layers are embodied to be as thick as possible without however risking the container 2 closing up in cross section. After the conclusion of this step, the getter device 1, which is used for example in a solar receiver, ideally has a getter material 3 that is completely deposited on the inside of the container 2 in the form of thick, multi-layer and dendritic layers, which have a porosity in the micrometer range or less and the surface of which is therefore completely accessible by gases after the opening of the seal 7. An activation of the getter device 1 thus produced usually takes place during an evacuation of the device in which the getter device 1 is installed, since the device is thereby heated at the same time in order to remove adsorbed gases. It is usual hereby to heat the device to temperatures up to 550° C.

Whereas it has hitherto been possible with a steel tube with a diameter of 12 mm and a length of 120 mm to use only a maximum of 3 g barium, with the method according to the invention 8 g to 10 g barium could be used with the same dimensions of a steel tube without a plug formation being observed with the deposit of barium. Accordingly, a getter capacity could be increased by more than 100%.

The invention claimed is:
1. A method for producing a getter device, comprising:
   introducing a getter material into a container;
   heating the getter material under reduced pressure to a temperature for evaporating the getter material; and
   axially moving the container relative to a cooling device surrounding the container to form a moving cooling zone in the container, whereby the evaporated getter material is deposited onto an inside of the container within the moving cooling zone.
2. The method according to claim 1, wherein the container is closed in a vacuum-tight manner before the getter material is heated.
3. The method according to claim 2, wherein the container is closed at least at one point with a seal of metal or an alloy melting at a temperature of 30° to 550° C.
4. The method according to claim 1, wherein the container is composed of a metal or an alloy and the getter material is heated by an induction heating device.

5. The method according to claim 4, wherein a cooling device is arranged at a distance from the induction heating device.

6. The method according to claim 5, wherein the cooling device comprises a nozzle surrounding the container, wherein an air flow from the nozzle is guided at an angle directed at the container so that air flowing away does not flow to the induction heating device.

7. The method according to claim 1, wherein a tube of a steel is used as the container.

8. The method according to claim 7, wherein a straight or a curved tube is used.

9. The method according to claim 1, wherein getter material of at least one alkali metal and/or alkaline earth metal or at least one alloy of alkali metal and/or alkaline earth metals is used.

10. The method according to claim 1, wherein getter material of barium is used.

11. A method for producing a getter device, comprising:
introducing a getter material into a container;
closing the container in a vacuum-tight manner;
converting the getter material to a gas by heating the getter material under reduced pressure;
forming a cooling zone in the closed vacuum-tight container with a cooling device surrounding the container, wherein the getter material gas is deposited on an inside of the closed-vacuum-tight container within the cooling zone; and axially moving the cooling zone along a length of the container by axially moving the closed vacuum-tight container relative to the cooling device surrounding the closed vacuum-tight container.

12. The method according to claim 11, wherein the closing of the container comprises closing the container at least at one point with one of a seal of metal or an alloy melting at a temperature of 30° to 550° C.

13. The method according to claim 11, wherein the container comprises a metal or an alloy and the getter material is heated by an induction heating device.

14. The method according to claim 13, wherein a cooling device is located at a distance from the induction heating device.

15. The method according to claim 14, wherein the cooling device comprises a ring nozzle surrounding the closed vacuum-tight container, and the method further comprises directing an air flow from the ring nozzle toward the closed vacuum-tight container at an angle so that air flowing away from the closed vacuum-tight container does not flow toward the induction heating device.

16. The method according to claim 11, wherein the container comprise a tube of a steel.

17. The method according to claim 16, wherein the tube comprises a straight or curved tube.

18. The method according to claim 11, wherein the getter material comprises at least one alkali metal and/or alkaline earth metal or at least one alloy of alkali metal and/or alkaline earth metals.

19. The method according to claim 11, wherein the getter material is barium.

\* \* \* \* \*